M. CHAREN.
METHOD OF AND APPARATUS FOR MANUFACTURING PINLESS TEETH.
APPLICATION FILED APR. 10, 1920.

1,364,480.

Patented Jan. 4, 1921.

INVENTOR
Myer Charen,
BY William J. Jackson
ATTORNEY.

UNITED STATES PATENT OFFICE.

MYER CHAREN, OF PHILADELPHIA, PENNSYLVANIA.

METHOD OF AND APPARATUS FOR MANUFACTURING PINLESS TEETH.

1,364,480.  Specification of Letters Patent.  Patented Jan. 4, 1921.

Application filed April 10, 1920. Serial No. 372,978.

*To all whom it may concern:*

Be it known that I, MYER CHAREN, a citizen of the United States, and a resident of Philadelphia, county of Philadelphia, and State of Pennsylvania, have invented certain new and useful Methods of and Apparatus for Manufacturing Pinless Teeth, of which the following is a specification.

As now manufactured pinless teeth, after being molded in the customary manner and before being baked, are vertically grooved or undercut and horizontally drilled to provide suitable anchorage portions when a tooth is applied to its rubber support as is well understood in the art. Such grooving and drilling procedure entails three distinct operations which consumes time and adds to the cost of manufacture. Further the operator in drilling the horizontal channel frequently miscalculates its proper position with the result that defective teeth are produced.

The principal object of the present invention is to overcome the above recited disadvantageous features and provide for the manufacture of pinless teeth in a more expeditious, cheaper, accurate, efficient and reliable manner. Other and further objects will hereinafter appear.

The invention consists of the improvements hereinafter described and finally claimed.

The nature, characteristic features and scope of the invention will be more fully understood from the following description taken in connection with the accompanying drawings forming part hereof, and in which.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Figure 1:
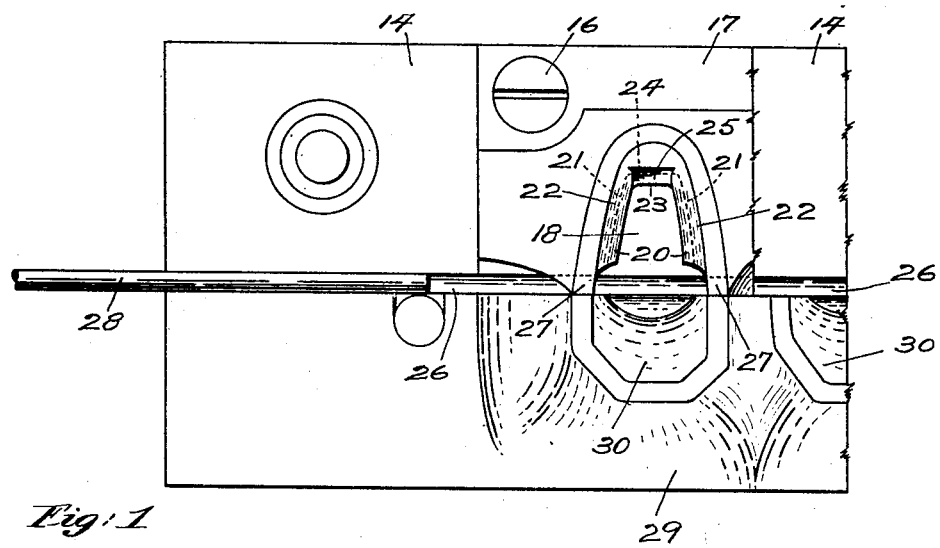
Figure 1, is a fragmentary view in plan of the lower portion of a mold as employed according to my method of manufacturing pinless teeth.
Figure 2:
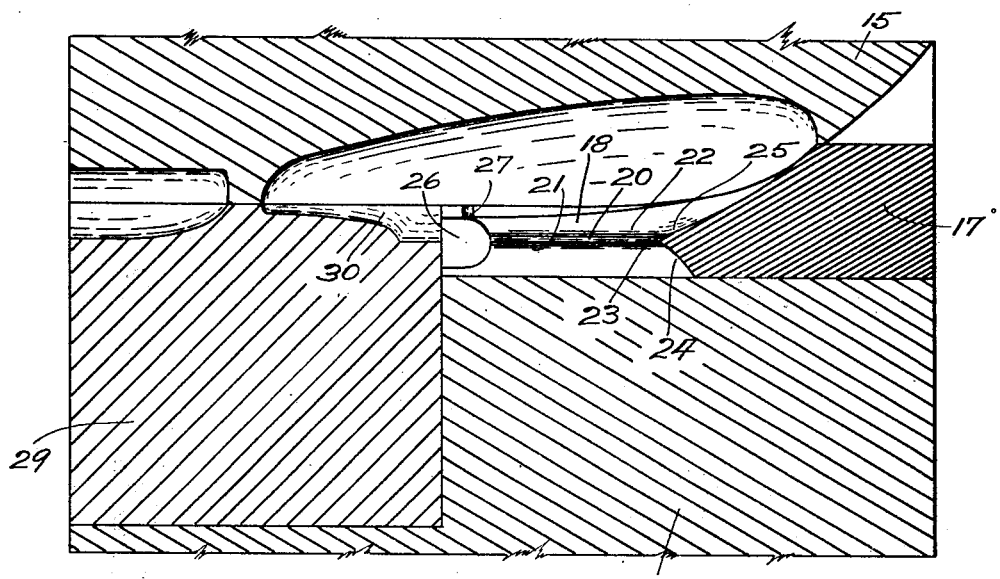
Fig. 2, is a view in cross section of the lower and upper portions of such mold.
Figures 3, 4:
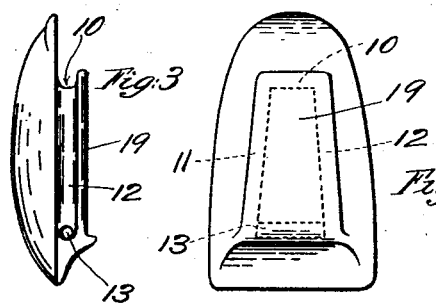
Fig. 3, is a view in side elevation of a pinless tooth as manufactured in accordance with my method.
Fig. 4, is a rear view thereof.

According to my method of manufacture a tooth is molded with a pair of vertical grooves or undercut portions, and with a lower horizontal channel or aperture therethrough. Such undercut portions and channel afford anchorage means when a tooth is fitted to its rubber support as is well known in the art. In addition to the above anchorage portions I have discovered that an additional horizontal undercut portion located adjacent the upper part of a tooth is advantageous and may be readily molded in a tooth simultaneously with the other anchorage portions if desired. In the drawings the upper groove or undercut portion is designated 10, the vertical undercut portions 11 and 12 respectively and the horizontal channel 13, see Figs. 3 and 4. In order to mold a tooth of this character I have devised the mold shown in Figs. 1 and 2. In said figures 14 designates the base of the mold and 15 the upper part thereof the latter of course being removable and differing in no manner from standard equipment. The base 14 will now be described. Fixed to the upper part of the base preferably in a removable manner as by screws 16, is a member 17 provided with pockets 18 for forming the buttons 19 upon the rear faces of the teeth shown in Figs. 3 and 4. The member 17 may, however, be an integral part of the base. The side wall of each pocket is provided with a rib 20 which provides an undercut portion 21 and a generally curved upper surface 22 as clearly shown in Fig. 2. Such ribs 20, undercut portions 21 and upper surfaces 22 serve to form grooves or undercut portions 11—12 of a tooth. If desired the rear wall of each pocket may be provided with a rib 23, an undercut portion 24 and an upper curved surface 25 to form an upper groove 10 upon a tooth. In order to form the channel 13 of a tooth the upper face of the base is longitudinally grooved as at 26 and the webs 27 between adjacent pockets of said member 17 are grooved in register with said groove 26. A wire 28 is fitted to said groove 26 when molding a tooth. The base 14 is in two parts of which a removable part is designated 29. The removable part is provided with pockets 30 in register with pockets 18.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim is:—

1. The herein described method of manufacturing a pinless tooth which consists in forming as an integral structure a facing and a backing, forming in said backing vertically disposed marginal grooves and further forming in said backing, adjacent the base thereof, a perpendicularly disposed channel which passes entirely through the backing, said formation being performed in a matrix in a single operation.

2. The method described in claim 1 characterized by forming in the same operation a horizontally grooved portion adjacent the top of a tooth.

3. In a matrix of the character stated, the combination of a two-part base of which one part is movable with respect to the other and is provided with spaced pockets and of which the other part is provided with a longitudinally disposed groove having removably seated therein a wire, a member fixed with respect to the top of the non-movable base part, said member being provided with pockets in register with the aforesaid pockets the side walls of which are provided with ribs, said member being provided with webs between adjacent pockets which webs are apertured in register with the groove of said base and an upper portion to complete said matrix.

4. A construction as described in claim 3 characterized by pockets in the non-movable member the end wall of each of which is also ribbed.

In testimony whereof, I have hereunto signed my name.

MYER CHAREN.